United States Patent [19]

Mehr-Ayin et al.

[11] Patent Number: 5,146,172

[45] Date of Patent: Sep. 8, 1992

[54] ENGINE IDENTIFICATION SYSTEM

[75] Inventors: Kourosh Mehr-Ayin, Vista; William Conn, Spring Valley; Luis M. Rivera; Andrew L. Gale, both of San Diego; Phillip A. Marsh, Lakeside, all of Calif.

[73] Assignee: Sundstrand Corp., Rockford, Ill.

[21] Appl. No.: 567,876

[22] Filed: Aug. 15, 1990

[51] Int. Cl.$^5$ .................. G01R 19/00; G08C 15/00
[52] U.S. Cl. ........................ 324/691; 340/870.38; 340/825.78; 324/66
[58] Field of Search ............... 324/691, 722, 66; 340/825.78, 870.38

[56] References Cited

U.S. PATENT DOCUMENTS

| | | |
|---|---|---|
| 3,441,804 | 4/1969 | Klemmer . |
| 3,528,104 | 9/1970 | Ehlshlager .................... 324/66 |
| 3,560,941 | 2/1971 | Wallace . |
| 3,806,904 | 4/1974 | Weinberger et al. .......... 340/870.38 |
| 3,863,231 | 1/1975 | Taylor ...................... 340/173 SP |
| 4,016,483 | 4/1977 | Rudin ........................ 323/74 |
| 4,344,064 | 8/1982 | Bitler ........................ 338/334 |
| 4,484,213 | 11/1984 | Franklin ..................... 357/51 |
| 4,575,714 | 3/1986 | Rummel ..................... 324/691 |
| 4,580,138 | 4/1986 | Morrison .................... 340/825.78 |
| 4,884,070 | 11/1989 | Hannaford ................... 340/825.78 |

FOREIGN PATENT DOCUMENTS 1161823 6/1985 U.S.S.R. .................. 324/66

OTHER PUBLICATIONS

Article entitled "Using Fusible Links to Apply Machine-Readable Serial Numbers to Printed-Circuit Boards" by R. B. Wahler, IBM Technical Disclosure Bulletin vol. 20, No. 6, Nov. 1977.

Primary Examiner—Kenneth A. Wieder
Assistant Examiner—Maura K. Regan
Attorney, Agent, or Firm—William D. Lanyi

[57] ABSTRACT

An identification module and identification determination circuitry are provided for the purpose of identifying an apparatus and electrically determining the identification number of that identified apparatus. The identification module comprises a plurality of resistive identification circuits which, in turn, each comprise a plurality of resistive elements selected to have resistive magnitudes that relate to each other by powers, or orders, of two. The identification determination circuit of the present invention places each of the resistive identification circuits in series with a resistor of known magnitude between two connection points to provide a voltage potential and a resulting current flowing through the resistive identification circuit. The invention also provides a means by which the input voltage can be determined and used to adjust the determined magnitude of the resistive identification circuit.

23 Claims, 4 Drawing Sheets

ENGINE IDENTIFICATION SYSTEM

BACKGROUND OF THE INVENTION

1. Field of the Invention

The present invention relates generally to an identification system and, more specifically, to an identification system and method for identifying a turbine engine with a numeric identity that is readable by a remote device connectible in electrical communication with an identification module attached to the turbine engine.

2. Description of the Prior Art

Many different types of systems have been developed to store a numeric value in such a way that the numeric identity can be determined by an external circuit that is connected in electrical communication with a module that is used to retain the stored identification value.

U.S. Pat. No. 3,560,941, which issued to Wallace on Feb. 2, 1971 discloses a circuit board that is used in the memory unit of a repertory dialer. The circuit board is provided with ten columns of electrically connected sockets with each column provided with a resistor that is weighted in resistive value according to the column in which it is located. Each of these columns is used to represent a digit value in an address. Ten rows are also provided and correspond to the digit positions in an address. In order to program the circuit board, a wire lead is connected from the socket in each row to a socket in the column corresponding to the digit value. This permits the programming of information directly in analog form on the board. The memory, comprising a plurality of such boards, stores three dimensional information in a two dimensional matrix. The weighted resistors provide the third dimensional information.

U.S. Pat. No. 3,863,231, which issued to Taylor on Jan. 28, 1975, discloses a read only memory with a plurality of annular fuse links. The memory device is provided with a set of input conductors that are disposed at right angles to a set of output conductors with each input conductor connected to each output conductor by a respective resistive fusible link. In operation, information is written into the memory device by passing currents that are large enough to fuse the selected links. All of the fusible links have resistance and dimensions such that they are not fused by application of a voltage of a predetermined magnitude but are fused by application of a voltage of twice that predetermined magnitude.

U.S. Pat. No. 4,344,064, which issued to Bitler et al on Aug. 10, 1982, describes a circuit package and a method of marking the circuit package in an identifiable manner. The circuit package typically includes thin film components of a circuit. The circuits on the package typically undergo tests and adjustment operations prior to final bonding of a chip to the circuit. A first value of an element marks the article as belonging to a first group of articles having first circuit characteristics. The initial value of the element is selectively altered to a second value upon a determination that the article has circuit characteristics other than those of the first group. In the preferred embodiment, the first group is a group of electrically acceptable articles while other characteristics are those of defective articles. The mark is typically altered by a current of sufficient magnitude to burn portions of the element or by selective application of radiant energy such as a laser beam.

U.S. Pat. No. 4,484,213, which issued to Franklin on Nov. 20, 1984, describes a binary weighted resistor package. This device provides a circuit which is variably configured to provide a plurality of individual resistance magnitudes. It comprises a plurality of series connected devices attached to a lead frame with a parallel circuit connected to each of the devices that can control the bypass or use of all or some of the connected devices. A plurality of series connected resistors, for example, are selected to have resistance magnitudes that relate to the other resistors by powers of two. By selectively breaking fusible links, the total series resistance of the resulting circuit can be tailored to any one of a plurality of magnitudes.

U.S. Pat. No. 3,441,804, which issued Klemmer on Apr. 29, 1969, describes a thin film resistor which includes a basic resistor intercoupled with a network of selectively intercoupled individual trimming resistors which add or subtract selected increments of resistance to that of the basic resistor. The minimum value trimming resistor provides a predetermined impedance while each other trimming resistor provides an impedance equal to a different power of two of that predetermined impedance. The trimming resistors may be connected in series or in parallel.

An article, by R. B. Wahler, appeared in the IBM Technical Disclosure Bulletin Volume 20 No. 6 in November 1977 which was entitled "Using Fusible Links to Apply Machine-Readable Serial Numbers to Printed-Circuit Boards". That article discloses the use of a series of parallel fusible links for the purpose of providing a group of binary ones or zeros which can be used as a serial number on a printed circuit board. This device does not utilize resistors or means for determining the resistance of an identification circuit. Instead, it provides a plurality of yes/no signals on parallel lines which can be read by automatic equipment.

U.S. Pat. No. 4,016,483, which issued to Rudin on Apr. 5, 1977, discloses a microminiature integrated circuit that includes weighted elements and contactless switching means for fixing the impedance at a preselected value. This circuit impedance device comprises a plurality of impedance elements formed on a substrate with each element having an impedance, a first input terminal, an output terminal and a plurality of electrically permanently alterable contactless switching elements. Each electrically permanently alterable contactless switching element comprises fusible conductive links or shortable diodes. In the preferred embodiment of this device, it comprises resistive elements fabricated with thin film or monolithic integrated circuit technology and serves as a variable resistor or as a variable voltage divider that performs the function of a fixable contactless trimming potentiometer.

U.S. Pat. No. 4,884,070, which issued to Hannaford on Nov. 28, 1989, discloses a method and apparatus for multiplexing switch signals. This device provides a single conductor for transmitting a signal which conveys information relating to the state of a plurality of switches which may be simultaneously or individually actuated from one position to another. It disposes a plurality of resistors in series between two points of differing voltage potential and places a switch in parallel with each of the resistors. In addition, the resistors are selected to have magnitudes that relate to each other by powers of two. By monitoring the voltage at a preselected point in the circuit, the number of switches that are actuated can be determined by determining the effective resistance of the hand held device containing the switches.

While the above described patents each relate generally to methods and devices which store identification information or permit the user to selectively determine a resistance of a component, none of the patents provide a means by which a device can be identified with a module that is relatively inexpensive and in which an identification number can be easily selected. In addition, the patents described above do not provide a device that can remotely read the identification number stored in the module with a relatively high degree of accuracy while using relatively few and inexpensive components to store the identification number in the module.

SUMMARY OF THE INVENTION

The present invention provides both an apparatus and method for identifying a turbine engine or other device with an identification module that can be remotely read by a circuit which is connectable in electrical communication with a module. A preferred embodiment of the present invention also provides a means by which the system can avoid being susceptible to variations in available input voltage sources and can also avoid being damaged by large voltage transients, typical of aircraft electrical environments. The present invention provides a system for determining the magnitude which is represented by an identification module and comprises a first means for connecting a resistor of known magnitude electrically in series with a resistive identification circuit of the identification module. In addition, the present invention comprises a second means for connecting the resistor of known magnitude and the resistive identification circuit electrically in series between an input voltage and electrical ground or, more generally, first and second connection points of different voltage potentials. Means is also provided for measuring a first voltage potential at a point between the resistor of known magnitude and the resistive identification circuit and for determining the resistive magnitude of the resistive identification circuit as a function of the magnitude of the resistor of known magnitude and the magnitude of the input voltage along with the magnitude of the first voltage potential. In a preferred embodiment of the present invention, means is also provided for connecting a pair of resistors of known magnitude electrically in series with each other between the input voltage and the electrical ground with the pair of resistors being connected electrically in parallel with the resistor of known magnitude and the resistive identification circuit. The system provides a means for measuring a second voltage potential at a point between the pair of resistors and for adjusting the determination of the resistive magnitude of the resistive identification circuit as a function of the second voltage potential.

The identification module of the present invention comprises a first resistive circuit which, in turn, comprises a first plurality of resistive elements connected in electrical series relation with each other between a first connection point and a second connection point with each of the resistive elements being connected electrically in parallel with a corresponding one of a plurality of frangible shunts. In a preferred embodiment of the present invention, the identification module also comprises a second resistive circuit comprising a second plurality of resistive elements connected in electrical series relation with each other between the first and second connection points with each one of the second plurality of resistive elements being connected in electrical parallel relation with a corresponding one of a second plurality of frangible shunts.

By breaking selected ones of the plurality of frangible shunts in the identification module, the module can be arranged to represent any of a vast number of numeric identities represented, in a binary manner, by the plurality of resistive circuits. Within each of the resistive circuits, the resistors are selected to have resistive magnitudes that relate to each other by powers, or orders, of two. This permits each of the resistive circuits to represent a binary value which is readable by an external system attached in electrical communication with the modules. Typically, the module of the present invention would be connected to an apparatus, such as a turbine engine, and would provide an identification number associated with that apparatus. When the apparatus is connected to an external system, that external system could then read the identification number from the module to which it is electrically connected. The present invention performs these functions in a way which permits the use of relatively inexpensive components. In addition, the present invention permits the storage of a relatively high number of distinct identification values with the use of a relatively small number of components within the identification module.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Throughout the description of the preferred embodiment, like components will be described with like reference numerals.

Figure 1:
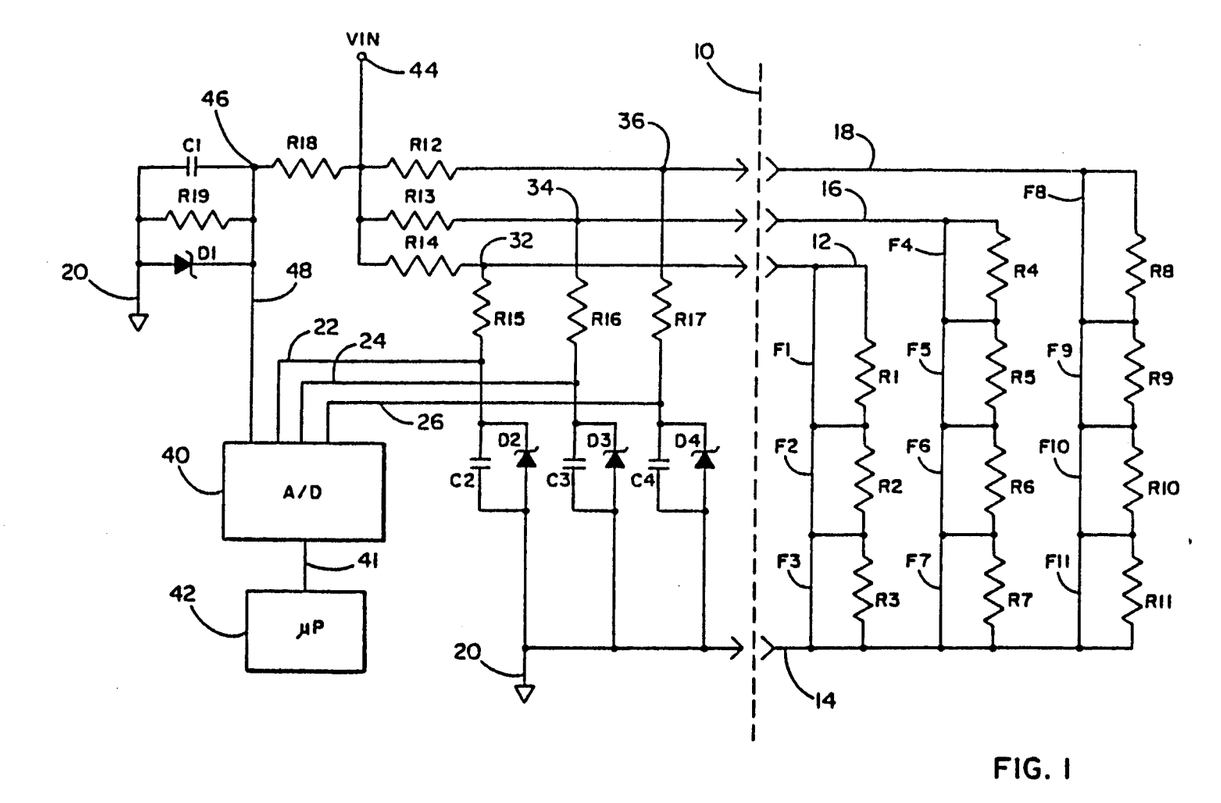
FIG. 1 illustrates the identification system of the subject invention and shows both the identification module and the system for reading the value stored by the identification module.

A preferred embodiment of the present invention is illustrated in FIG. 1. The identification module is illustrated schematically to the right of dashed line 10, which represents the connection interface between the identification module and a system for reading the value represented by the module. To the left of the dashed line 10, the system of the present invention used to determine the numeric representation of the identification module is illustrated schematically. In the embodiment of the present invention illustrated in FIG. 1, the identification module is shown comprising eleven resistors arranged in three groups of serially connected resistors. Each of these groups is a separate resistive identification circuit used by the present invention. For example, one of the resistive identification circuits shown to the right of dashed line 10 comprises resistors R1, R2 and R3. These three resistive elements are connected in series between a first connection point 12 and a second connection point 14. Each of the resistive elements is also connected electrically in parallel with a corresponding frangible conductor, or shunt. For example, resistor R1 is connected electrically in parallel with the frangible conductor F1, resistor R2 is connected electrically in parallel with frangible conductor F2 and resistor R3 is connected electrically in parallel with frangible conductor, or shunt, F3. It can be seen that, by breaking any of the three frangible conductors, or shunts, corresponding to resistors R1, R2 and R3, any current flowing from connection point 12 to connection point 14 would be forced to pass through the resistor associated with the corresponding broken shunt. For those resistors associated with an unbroken frangible shunt, no appreciable current would pass through the resistor because of the availability of the parallel conduction path provided by the unbroken shunt. As can be seen from Table I, the resistive magnitudes of resistors R1, R2 and R3 have been chosen to result in each of these resistive elements having a magnitude which is related to the other of the three resistive elements by powers of two. In other words, resistor R1 is approximately twice the resistance of resistor R2 and resistor R2 is approximately twice the resistance of resistor R3. This creates a generally binary relationship between these three resistors in the first resistive identification circuit. Therefore, by breaking preselected ones of the three frangible shunts F1, F2 and F3, a resistive magnitude between connection points 12 and 14 can be selected to be zero ohms, 200 ohms, 402 ohms, 602 ohms, 796 ohms, 996 ohms, 1198 ohms or 1398 ohms. By using three resistors in this manner, the present invention provides a module in which eight different and distinct resistances can be placed between connection points 12 and 14.

TABLE I

| Reference | Type or Magnitude |
| --- | --- |
| R1 | 796 Ohms |
| R2 | 402 Ohms |
| R3 | 200 Ohms |
| R4 | 1,600 Ohms |
| R5 | 796 Ohms |
| R6 | 402 Ohms |
| R7 | 200 Ohms |
| R8 | 1,600 Ohms |
| R9 | 796 Ohms |
| R10 | 402 Ohms |
| R11 | 200 Ohms |
| R12 | 8,660 Ohms |
| R13 | 8,660 Ohms |
| R14 | 8,660 Ohms |
| R15 | 10 K-Ohms |
| R16 | 10 K-Ohms |
| R17 | 10 K-Ohms |
| R18 | 40.2 K-Ohms |
| R19 | 10 K-Ohms |
| C1 | 0.47 Microfarad |
| C2 | 0.10 Microfarad |
| C3 | 0.10 Microfarad |
| C4 | 0.10 Microfarad |
| D1 | 13 Volt |
| D2 | 13 Volt |
| D3 | 13 Volt |
| D4 | 13 Volt |
| 40 | Multiplexer and A/D (HI-506A and HI-547A) |

TABLE I-continued

| Reference | Type or Magnitude |
| --- | --- |
| 42 | Micro Processor |

Also shown in FIG. 1, connected in parallel with the first resistive identification circuit is a second resistive identification circuit comprising resistors R4, R5, R6 and R7 which are each connected in series with each other between connection point 16 and connection point 14 and, in addition, are connected in parallel with corresponding frangible shunts F4, F5, F6 and F7. The magnitudes of these four resistors of the second resistive identification module are shown in Table I. By comparing the resistive magnitudes of resistors R4-R7, it can be seen that sixteen distinct magnitudes can be represented by the four resistors between connection points 16 and 14. Similarly, a third resistive identification circuit is provided between connection point 18 and connection 14. That resistive identification circuit comprises resistors R8, R9, R10 and R11 which are each, in turn, connected electrically in parallel with a corresponding frangible shunt, or conductor, F8, F9, F10 and F11. As can be seen in FIG. 1, these first, second and third resistive identification circuits are all connected to connection point 14. In addition, if connection points 12, 16 and 18 are connected to the circuit shown to the left of dashed line 10 in such a way that they are all in electrical communication with a common point, such as the point between resistor 12 and resistor 18, the three resistive identification circuits will be connected in parallel with each other between a voltage source and electrical ground.

In FIG. 1, the identification determining portion of the present invention is shown to the left of dashed line 10. The circuit provides a means for connecting resistor R12, which has a known resistive magnitude, electrically in series with the resistive identification circuit that comprises resistors R8, R9, R10 and R11. In addition, the circuit shown to the left of dashed line 10 provides a means for connecting a resistor R13 of known magnitude in electrical communication with the second resistive identification circuits which comprises resistors R4, R5, R6 and R7. This connecting means is able to connect resistor R13 electrically in series with the second resistive identification circuit between the input voltage and electrical ground. Similarly, resistor R14 is connected, by the present invention, in series with the first resistive identification circuit. It should also be noted that resistors R12, R13 and R14 provide current limiting when all of the shunts F1-F11 are unbroken.

When the identification module, shown to the right of dashed line 10, is connected in electrical communication with the circuit shown to the left of dashed line 10, the three resistive identification circuits are connected in parallel with each other between the input voltage and electrical ground 20. In addition, the present invention provides a means for measuring voltage potentials at points between the resistors of known magnitude, such as resistors R12, R13 and R14, and the corresponding resistive identification circuits. That voltage measuring means is shown by the connections between lines 22, 24 and 26 and their respective connection points 32, 34 and 36 through resistors R15, R16 and R17. Therefore, the analog-to-digital converter 40 is connected in signal communication with points between the resistors of known magnitude and their corresponding resistive identification circuits. This permits the analog-to-digital converter to provide digital signals, on a multiplexed basis, to the microprocessor 42.

FIG. 1 also illustrates a connection between the voltage input and ground 20 in which a pair of resistors of known magnitude are connected in series between the input voltage 44 and ground 20. That pair of resistors comprises resistor R18 and resistor R19, both of which are of a known resistive magnitude. The current flowing through resistors R18 and R19 provides a voltage drop, measurable at point 46, which enables the present invention to accurately determine the magnitude of the input voltage at point 44. As can be seen in FIG. 1, the multiplexed analog-to-digital converter 40 is connected in signal communication, by line 48, to point 46. The measurement provided on line 48 permits an adjustment to be made to the calculation of the resistances of the three resistive identification circuits based on the actual measured magnitude of the voltage provided at point 44.

Figure 2:
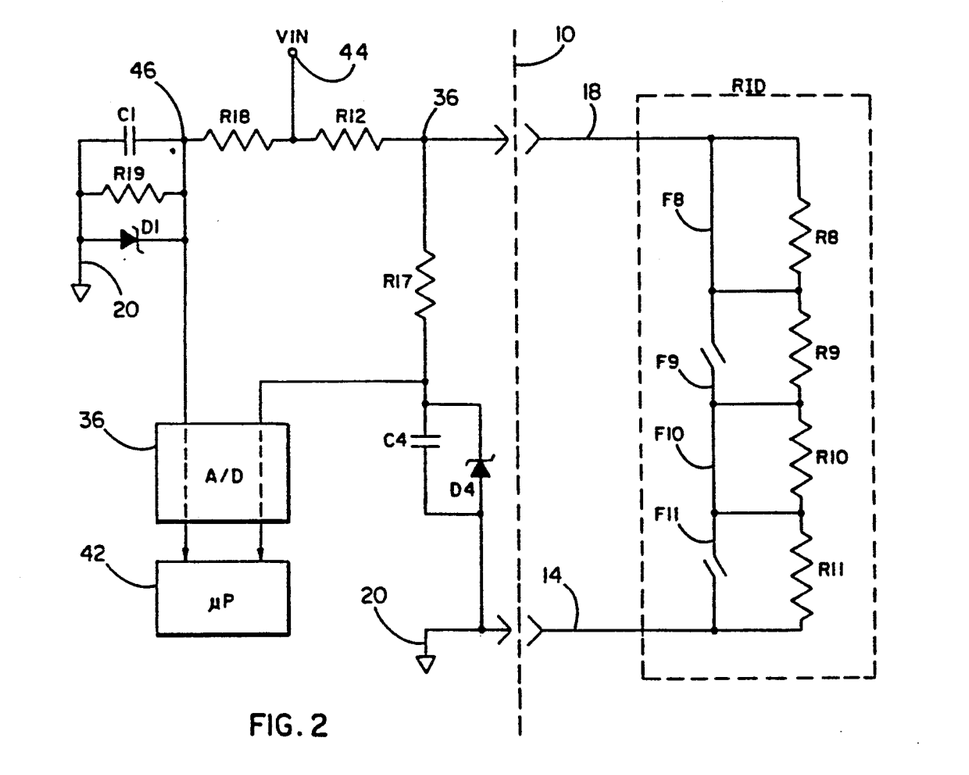
FIG. 2 shows one specific resistive identification circuit connected in electrical communication with one specific portion of the system of the present invention.
Figure 3:
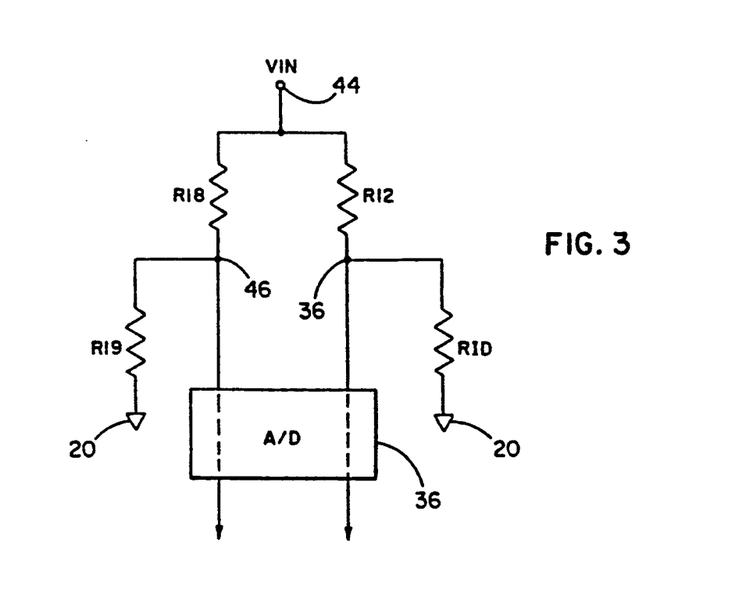
FIG. 3 illustrates a schematic representation of the present invention.

FIG. 2 illustrates a simplified version of the circuitry shown in FIG. 1. In FIG. 2, Only one resistive identification circuit is shown. The other components, not related to the measurement of the resistance RID provided by the combination of resistors R8, R9, R10 and R11 along with the associated and corresponding shunts, have been deleted from the Figure to simplify the description of the present invention and the method used to determine the resistance RID represented by the resistive identification module. Dashed line 10 represents the interface between the identification determination circuitry shown to left of FIG. 2 and the identification module shown to the right of FIG. 2. The connectors shown proximate the dashed line 10 represent male and female connectors that are used to place the circuitry of the present invention shown to the left of FIG. 2 in electrical communication with the identification module. It should be understood that the connection indicated by dashed line 10 utilizes a cable that extends between the identification module and the circuit shown to the left of the dashed line. When this connection is made, resistor 12 is connected in series with the resistive identification circuit, between the voltage input at point 44 and electrical ground 20. For purposes of describing the present invention, frangible shunts F9 and F11 are shown as being intentionally broken. This causes current, flowing from the input voltage source at point 44, to pass through resistors R9 and R11. Since frangible conductors F8 and F10 are unbroken, they provide a bypass shunt around their corresponding resistors, R8 and R10. In view of the fact that, as shown in Table I, resistor R9 has a magnitude of 796 ohms and resistor R11 has a magnitude of 200 ohms, the total resistance RID of the resistive identification circuit is 996 ohms. As will be described below in greater detail, 996 ohms represents the number 5 in one particular coding scheme that will be used for purposes of this description. The purpose of the circuit shown to the left of dashed line 10 in FIG. 2 is to determine the resistance RID of the resistive identification circuit and thereby determine the numeric value represented by that resistance. To accomplish that task, the present invention provides a means by which the unknown resistance RID of the resistive identification module is connected in series with a resistor R12 of a known resistive magnitude between an input voltage at point 44 and ground potential 20. If the input voltage is known, the voltage potential at point 36 will permit the resistance RID to be calculated. The multiplexed analog-to-digital converter 40 is connected to point 36 through resistor R17 and the digital representation of that voltage is provided to the microprocessor 42. Since, in some situations, the input voltage at point 44 may not be accurately known, a pair of resistors, R18 and R19, are connected in series between the input voltage at point 44 and ground potential 20. The voltage potential at a point 46 between the pair of known resistors is measured by the analog-to-digital converter 36 and the digital representation of that voltage potential is provided to the microprocessor 42. As will be described in detail below, the value of the voltage potential at point 46 permits the microprocessor to adjust the value determined from the voltage potential reading at point 36 to account for variations in the magnitude of the input voltage at point 44. FIG. 3 shows an even more simplified representation of the circuit in FIG. 2.

With continued reference to FIG. 3, it can be seen that the magnitude of the resistance RID can be determined as a function of the voltage potential VID at point 36 and the magnitude of the input voltage VIN as shown in equation 1 below:

$$RID = ((VID)(R12))/(VIN - VID) \qquad (1)$$

with continued reference to FIG. 3, it can also be seen that the voltage measured at point 46, referred to as V28, can be expressed in terms of the input voltage VIN and the pair of resistors R18 and R19 as follows:

$$V28 = ((VIN)(R19))/(R18 + R19) \qquad (2)$$

as a result, the input voltage VIN can be expressed in terms of the voltage potential V28 measured at point 46 by the expression:

$$VIN = ((R18 + R19)(V28))/R19 \qquad (3)$$

by combining equations 1 and 3, the unknown resistance RID can be expressed in terms of the voltage potential VID measured at point 36 and the voltage potential V28 measured at point 46 along with the known constant magnitudes of resistors R12, R18 and R19. This relationship can be expressed as follows:

$$RID = R12/(((V28)(R18 + R19)/VID/R19)) - 1 \qquad (4)$$

Therefore, it can be seen that, by measuring the voltage at point 36 and the voltage at point 46, the magnitude of the unknown resistance RID can be determined even though the input voltage VIN is unknown.

Referring again to FIG. 2, it can be seen that the circuit shown to the left of dashed line 10 can be used to determine the magnitude of resistance RID which is part of an identification module shown to the right of dashed line 10. It can also be seen that the same techniques described above can be used to determine the individual resistances of all three resistive identification circuits shown in FIG. 1. In order to utilize the techniques described above for the purpose of providing an identification module which is remotely readable by a circuit such as that shown in FIG. 1, each magnitude of resistance RID for each of the resistive identification circuits is assigned a count value. The relationship between the resistance magnitude RID and the count magnitude represented by that resistance is illustrated in Table II. It should be understood by those skilled in the art that the components shown in Table I and the values shown in Table II should be selected with the appropriate tolerances to reflect the accuracy requirements of the specific application.

TABLE II

| VID | RID | COUNT | INTEGER |
|---|---|---|---|
| .632 | 200 | 1.5 | 1 |
| 1.242 | 402 | 2.51 | 2 |
| 1.8199 | 602 | 3.51 | 3 |
| 2.357 | 796 | 4.48 | 4 |
| 2.888 | 996 | 5.48 | 5 |
| 3.4027 | 1198 | 6.48 | 6 |
| 3.8918 | 1398 | 7.48 | 7 |
| 4.366 | 1600 | 8.5 | 8 |
| 4.818 | 1800 | 9.5 | 9 |
| 5.25755 | 2002 | 10.51 | 10 |
| 5.6763 | 2202 | 11.51 | 11 |
| 6.06801 | 2396 | 12.48 | 12 |
| 6.457711 | 2596 | 13.48 | 13 |
| 6.83749 | 2798 | 14.49 | 14 |
| 7.2005 | 2998 | 15.49 | 15 |

For example, a measured resistance RID that is equal to 602 Ohms represents an integer value 3. This relationship is determined by the equation:

$$Count = (RID + 100)/200 \quad (5)$$

Therefore, a resistance value of 602 Ohms results in the value 3.51 determined by equation 5. The integer representation of that value is used by the present invention to determine the identity represented by the resistive identification circuit. As another example, a resistance of 2202 Ohms results in a calculated count of 11.51 which, in turn, yields an integer 11. In the resistive identification circuits shown in FIG. 1 which include four resistors, a maximum integer count of 15 is possible. For example, if the resistance RID is equal 2998 Ohms, equation 5 yields 15.49 which is, in turn, representative of the integer 15.

It should be understood that the equations described above, in a preferred embodiment of the present invention, are solved by the utilization of software programs resident in the microprocessor 42 that is shown in FIGS. 1 and 2. The microprocessor 42 receives information on line 41 from the analog-to-digital converter 40. The analog-to-digital converter 40 multiplexes the signals received on lines 22, 24 and 48 and provides digital representation of those analog signals, on line 41, to the microprocessor 42. The converter 40 converts the analog voltage into a 12-bit digital value that is transmitted to the 16-bit microprocessor data bus. The microprocessor ignores the most significant 4-bit portion and processes the relevant 12-bits in its computation. The microprocessor is an Intel 80C186 processor. It should also be understood that the two lines located between the analog-to-digital converter 36 shown in FIG. 2 and the microprocessor 42 shown in FIG. 2 represent the fact that two unique values are passed between the analog-to-digital converter and the microprocessor however, it should also be understood that the information between these two devices is transmitted on the same communications link regardless of whether the digital value corresponds to the analog value received on lines 22, 24, 26, 24 and 48. For this reason, the analog-to-digital function is identified in FIGS. 2 and 3 by reference numeral 36 and illustrated as having two different outputs in each of those Figures while being identified by reference numeral 40 in FIG. 1 with the single communications link 41 illustrated between the analog-to-digital converter and the microprocessor.

To permit relatively large identification numbers to be represented by the eleven resistors shown in FIG. 1, the microprocessor 42 multiplies the integer counts determined for the first resistive identification circuit, which comprises resistors R1, R2 and R3, by 256, multiplies the integer counts determined for the second resistive identification circuit, which comprises resistors R4, R5, R6 and R7 by 16, and then adds these two results to the integer value determined for the third resistive identification circuit which comprises resistors R8, R9, R10 and R11. When treated in this manner, the eleven resistors shown to the right of dashed line 10 in FIG. 1 form a hexadecimal array which can represent 2,048 different identification numbers.

Figure 4:
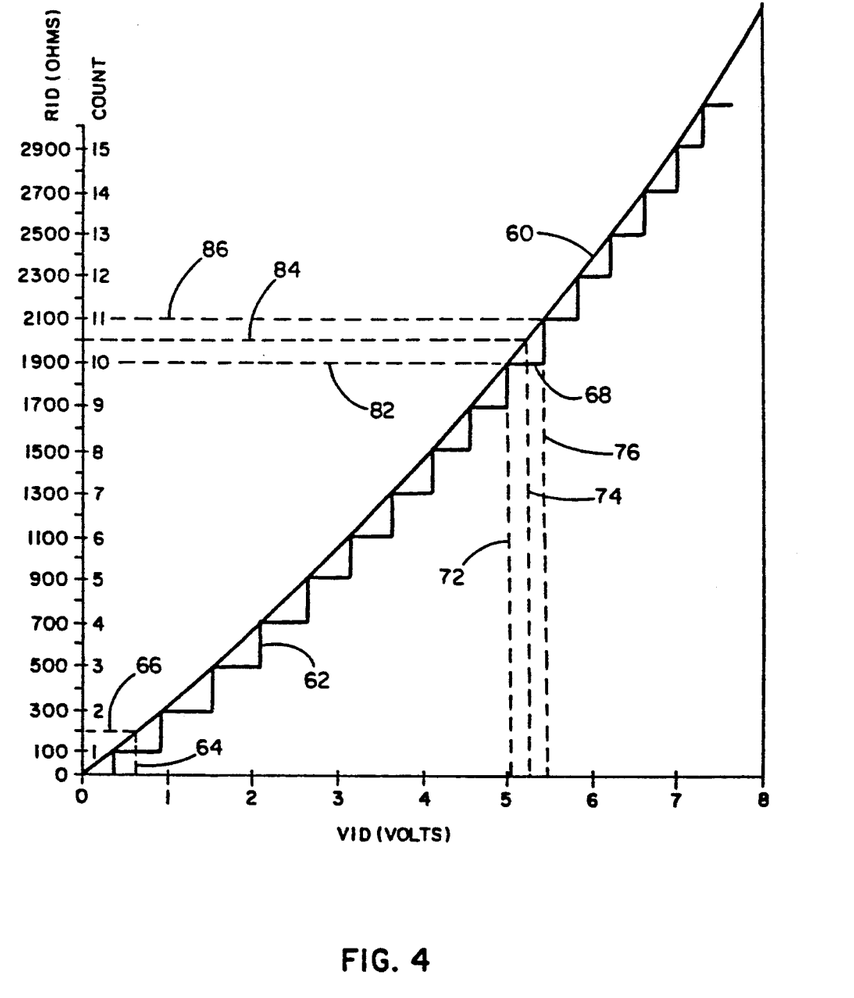
FIG. 4 shows the relationship between the resistance of the identification circuit, the voltage read by the present invention and the numeric count represented by the resistance of the identification circuit.

FIG. 4 illustrates the relationship between the resistance RID of a resistive identification circuit, such as the one comprising resistors R8, R9, R10 and R11 in FIG. 1, and the voltage VID that would be sensed at a point between the resistive identification circuit and the resistor R12 of known magnitude if the components are of the type described in Table I. Of course, it should be clearly understood that different magnitudes of components and input voltage would result in different values than that indicated in FIG. 4. However, FIG. 4 is illustrative of the relationship between the voltage read at point 36 in FIG. 1 and the resistive magnitude of the identification circuit. In FIG. 4, the voltage potential measured at point 36 is illustrated as the independent variable with the actual determined resistance RID being shown as the dependent variable. These values are shown in this manner in FIG. 4 to illustrate that the unknown resistance RID can be determined as a function of the measured voltage VID at point 36. Line 60 in FIG. 4 illustrates the relationship between the resistance RID of the resistive identification circuit and the voltage VID measured at point 36. As shown in FIG. 4, the count is a direct one-to-one relationship with the resistance RID. This relationship is illustrated by the dual vertical axes. The step function 62 shown in FIG. 4 illustrates the fact that the preferred embodiment of the present invention converts the calculated count to an integer number for the purpose of determining the stored value in the identification module. In other words, every value of the count represented by line 60 between 6.000 and 6.999 is converted to the integer value 6 prior to being treated as a hexadecimal digit by the microprocessor 42.

This integer conversion is illustrated by the relationship shown between line 60 and the step function 62. By comparing FIG. 4 to Table II, it can be seen that a measured voltage VID of 0.632 volts, as represented by line 64, would result in a calculated value of 200 ohms for the magnitude of RID. This is represented by line 66 in FIG. 4. Line segment 68 of the step function 62 represents all of the voltage values that would result in an integer value of 10 under a preferred embodiment of the present invention. In other words, every value of voltage VID within the range represented by lines 72 and 76 would result in a calculated resistance RID that falls within the range represented by lines 82 and 86. Therefore, it can be seen that a direct and calculable relationship exists between the measured voltage VID and the integer number represented by the preselected resistance RID of the resistive identification circuit of the present invention.

Figure 5:
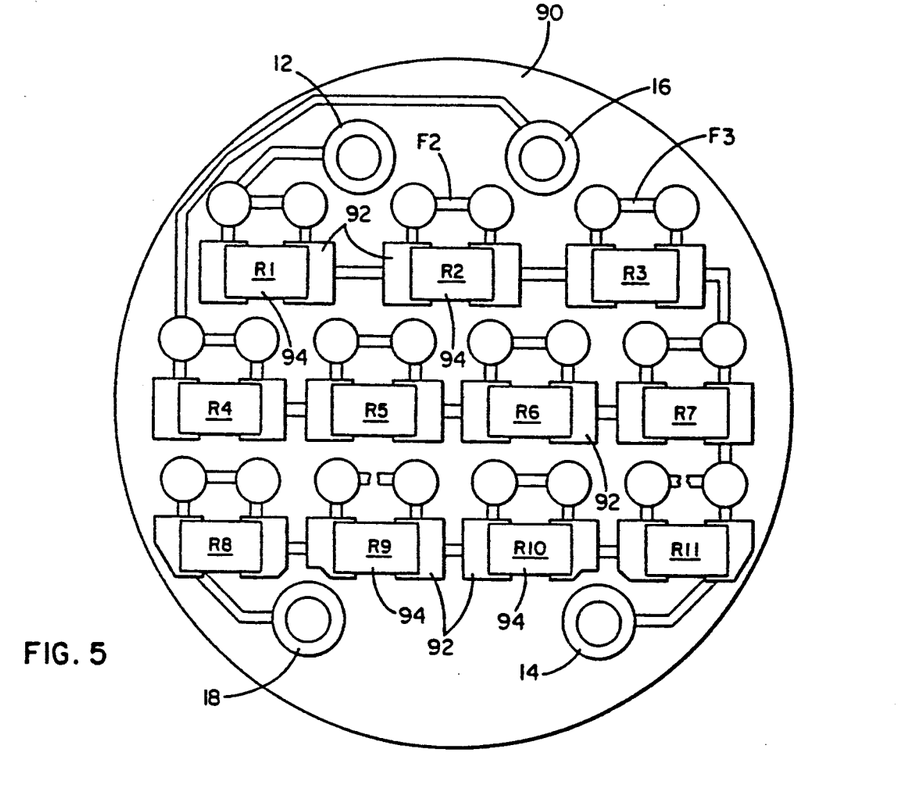
FIG. 5 shows an exemplary illustration of a circuit used to implement the identification module of the present invention.

FIG. 5 illustrates a physical embodiment of the subject invention. A circuit board 90 is provided with a plurality of conductive pads 92 which are arranged in such a way that they can receive resistive components, such as surface mounted resistors R1-R11, as illustrated. The physical embodiment as illustrated in FIG. 5 is electrically identical to the circuit shown schematically to the right portion of dashed line 10 in FIG. 1. Furthermore, all like components have been similarly labeled with like reference numerals. The overall size of the circuit board 90, the arrangement of the plated current paths and the selection of components permit the device illustrated in FIG. 5 to be associated with a standard connector, which will be described in greater detail below in conjunction with FIG. 6, for attachment to an apparatus such as a turbine engine. As can be seen in FIG. 5, the illustrated physical embodiment provides a resistive identification module that is operatively identical to the circuitry shown in the right portion of FIG. 1. As can also be seen in FIG. 5, each of the resistor positions is provided with a frangible conductor, or shunt, which provides a bypass around the resistor. In FIG. 5, only frangible shunts F2 and F3 are specifically identified. However, it should clearly be understood that each resistor R1-R11, is associated with a corresponding frangible shunt as shown. Connection points, 12, 14, 16 and 18, which are illustrated in FIG. 1, are also shown in FIG. 5. In FIG. 5, these connection points are provided by holes through the circuit board 90 which have been plated for electrical connection to the circuit components illustrated in FIG. 5. Also, for purposes of more specifically illustrating the concepts of the present invention, frangible shunts F9 and F11 are shown as being broken in FIG. 5 to correspond with the illustration in FIG. 2 and the description relating to FIG. 2. The physical configuration shown in FIG. 5 permits the present invention to be embodied in a way that requires very little space and allows relatively inexpensive components to be used to perform the operation of the present invention.

Figure 6:
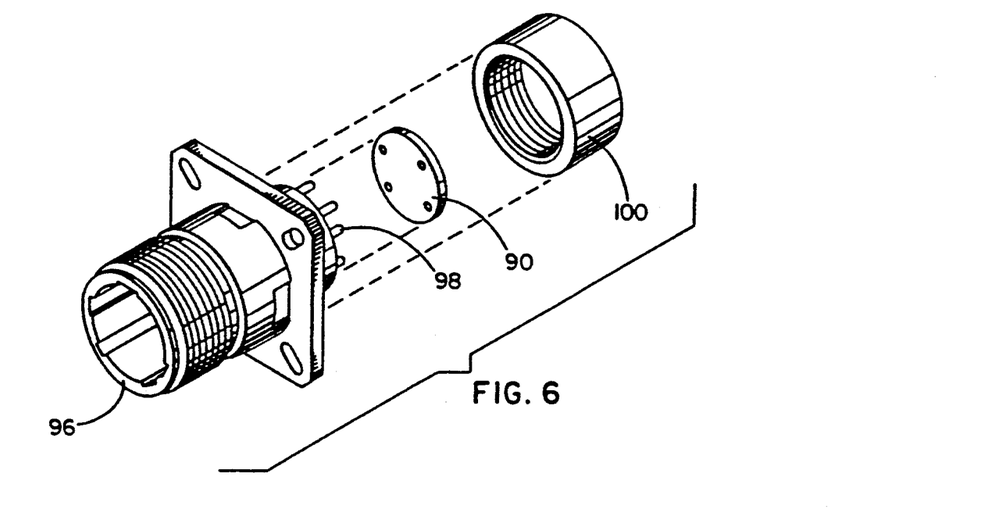
FIG. 6 illustrates one possible embodiment of the physical structure used to implement the present invention.

FIG. 6 illustrates a physical embodiment that can be used, in conjunction with the device illustrated in FIG. 5, to implement the preferred embodiment of the present invention. A connector 96, which can be a standard M83723/82 connector, is attached to a turbine engine structure (not shown in FIG. 6) or the structure of any apparatus for which an identification number is to be provided. The circuit board 90 is physically attached to the pins 98 of the connector 96. It should be understood that only four pins 98 are required for the implementation of the preferred embodiment of the present invention. Those pins would be associated with the through-holes shown in FIG. 5 and identified by reference numerals 12, 14, 16 and 18. It should also be understood that, for simplicity, the resistors and frangible shunts, which are illustrated in detail in FIG. 5, are not shown on the circuit board 90 in FIG. 6. After the circuit board 90 and its associated components are connected to the pins 98 to provide electrical communication between those pins and the components on the circuit board 90, the closed backshell 100 is threaded onto the connector 96 to provide physical protection for the components on the circuit board 90. The combination of the connector 96, the circuit board 90 and its associated components, along with the closed backshell 100, make up the identification module in one specific preferred embodiment of the present invention. However, it should be understood that other physical embodiments are to be considered within the scope of the invention. This identification module is intended to stay attached to the apparatus for which it provides an identity number. When that apparatus is installed in an operating environment, an electrical cable can be connected to the connector 96 for the purpose of connecting the circuit, shown to the left of the dashed line 10 in FIG. 1, in electrical and signal communication with the identification module. That cable would be provided with pins that mate with the pins in the connector 96 and provide the electrical connections illustrated at the dashed line 10 in FIG. 1. In a specific preferred embodiment of the present invention, the closed backshell 100 would be visibly marked with the I.D. number represented by the resistors and frangible shunts on the circuit board 90.

Although the present invention has been described in specific detail and illustrated with significant particularity, it should be understood that alternative embodiments of the present invention are to be considered within the scope of the claims. For example, the use of four resistors (e.g. R8, R9, R10 and R11) to provide a resistive identification circuit is not to be considered limiting. Other numbers of resistors could also be used within the scope of the present invention. In addition, although FIG. 1 illustrates three such resistive identification circuits as providing the entire identification module circuit, alternative numbers of identification circuits could also be employed. Furthermore, although Table I shows specific component selections used in a preferred embodiment of the present invention and Table II shows specific resistor sizes and parameter relationships, alternative sizes and types of components ar within the scope of the present invention.

We claim:

1. An identification system, comprising:
a first resistor of known magnitude;
first means for connecting said first resistor of known magnitude electrically in series with a first resistive identification circuit between an input voltage and electrical ground;
first means for measuring a first voltage magnitude at a point between said first resistor of known magnitude and said first resistive identification circuit;
a second resistor of known magnitude and a third resistor of known magnitude, said second and third resistors being connected electrically in series between said input voltage and said electrical ground;
second means for measuring a second voltage magnitude at a point between said second and third resistors; and
first means for determining the resistance magnitude of said first resistive identification circuit as a function of said first voltage magnitude and second voltage magnitude;
second means for connecting a fourth resistor of known magnitude electrically in series with a second resistive identification circuit between said input voltage and said electrical ground; and
third means for measuring a third voltage magnitude between said fourth resistor of known magnitude and said second resistive identification circuit.

2. The identification system of claim 1, further comprising:
determining means for determining the resistance magnitude of said first resistive identification circuit as a function of said first voltage magnitude and second magnitude.

3. The identification system of claim 1, further comprising:
said determining means for determining the resistance magnitude of said second resistive identification circuit as a function of said second voltage magnitude and said third voltage magnitude.

4. The identification system of claim 3, further comprising:
an identification module comprising said first and second resistive identification circuits, said identification module being connected in electrical communication with said first and second connecting means.

5. The identification system of claim 1, further comprising:
third means for connecting a fifth resistor of known magnitude electrically in series with a third resistive identification circuit between said input voltage and said electrical ground; and
fourth means for measuring a fourth voltage magnitude between said fifth resistor and said third resistive identification circuit.

6. The identification system of claim 5, further comprising:
said determining means for determining the resistance magnitude of said third resistive identification circuit as a function of said second voltage magnitude and said fourth voltage magnitude.

7. The identification system of claim 6, further comprising:
an identification module comprising said first, second and third resistive identification circuits, said identification module being connected in electrical communication with said first, second and third connecting means.

8. The identification system of claim 1, further comprising:
an identification module comprising said first resistive identification circuit, said identification module being connected in electrical communication with said first connecting means.

9. Apparatus for reading a resistively coded identification value, comprising:
means for connecting a first resistive identification circuit electrically between a first connection point and a second connection point;
means for disposing a first resistor of known magnitude electrically in series with said first resistive identification circuit between said first connection point and said second connection point;
means for providing a voltage potential between said first and said second connection points;
first means for measuring a first voltage at a point between said first resistor of known magnitude and said first resistive identification circuit;
means for connecting a second resistive identification circuit electrically between said first and second connection points;
means for disposing a second resistor of known magnitude electrically in series with said second resistive identification circuit between said first connection point and said second connection point; and
third means for measuring a second voltage at a point between said second resistor of known magnitude and said second resistive identification circuit.

10. The apparatus of claim 9, further comprising:
means, connected in signal communication with said first measuring means, for determining the resistance of said first resistive identification circuit as a function of said first voltage.

11. The apparatus of claim 9, further comprising:
means for disposing a serially connected pair of resistors of known magnitude electrically between said first and second connection points; and
second means for measuring a reference voltage at a point between said pair of resistors.

12. The apparatus of claim 11, further comprising:
means connected in signal communication with said first and second measuring means, for determining the resistance of said first resistive identification circuit as a function of said first and reference voltages.

13. The apparatus of claim 12, further comprising:
means, connected in signal communication with said second measuring means, for determining the resistance of said second resistive identification circuit as a function of said second voltage.

14. The apparatus of claim 13, further comprising:
means for disposing a serially connected pair of resistors of known magnitude electrically between said first and second connection points; and
second means for measuring a reference voltage at a point between said pair of resistors.

15. The apparatus of claim 14, further comprising:
means, connected in signal communication with said second and third measuring means, for determining the resistance of said second resistive identification circuit as a function of said second and reference voltages.

16. The apparatus of claim 15, further comprising:
means for determining an identification value represented by said first and second resistive identification circuits as a function of said resistances of said first and second resistive identification circuits.

17. The apparatus of claim 15, further comprising:
means for multiplying said determined resistance of said first resistive identification circuit by a first predetermined value; and
means for multiplying said determined resistance of said second resistive identification circuit by a second predetermined value.

18. A method for reading a resistively coded identification value, comprising:
connecting a first resistive identification circuit electrically between a first connection point and a second connection point;
disposing a first resistor of known magnitude electrically in series with said first resistive identification circuit between said first connection point and said second connection point;
providing a voltage potential between said first and said second connection points;
determining the resistance of said first resistive identification circuit as a function of first voltage;
disposing a serially connected pair of resistors of known magnitude electrically between said first and second connection points;
measuring a reference voltage at a point between said pair of resistors;
determining the resistance of said first resistive identification circuit as a function of first and said reference voltages;

connecting a second resistive identification circuit electrically between said first and second connection points;

disposing a second resistor of known magnitude electrically in series with said second resistive identification circuit between said first connection point and said second connection point; and measuring a second voltage at a point between said second resistor of known magnitude and said second resistive identification circuit.

19. The method of claim 18, further comprising:

determining the resistance of said second resistive identification circuit as a function of said second voltage.

20. The method of claim 18, further comprising:

disposing a serially connected pair of resistors of known magnitude electrically between said first and second connection points; and measuring a reference voltage at a point between said pair of resistors.

21. The method of claim 20 further comprising:

determining the resistance of said second resistive identification circuit as a function of said second and reference voltages.

22. The method of claim 21, further comprising:

determining an identification value, represented by said first and second resistive identification circuits, as a function of said resistors of said first and second resistive identification circuits.

23. The method of claim 21, further comprising:

multiplying said determined resistance of said first resistive identification circuit by a first predetermined magnitude; and multiplying said determined resistance of said second resistive identification circuit by a second predetermined magnitude.

* * * * *